April 6, 1926.
E. L. BLICK
WEIGHING SCALE
Filed June 4, 1923
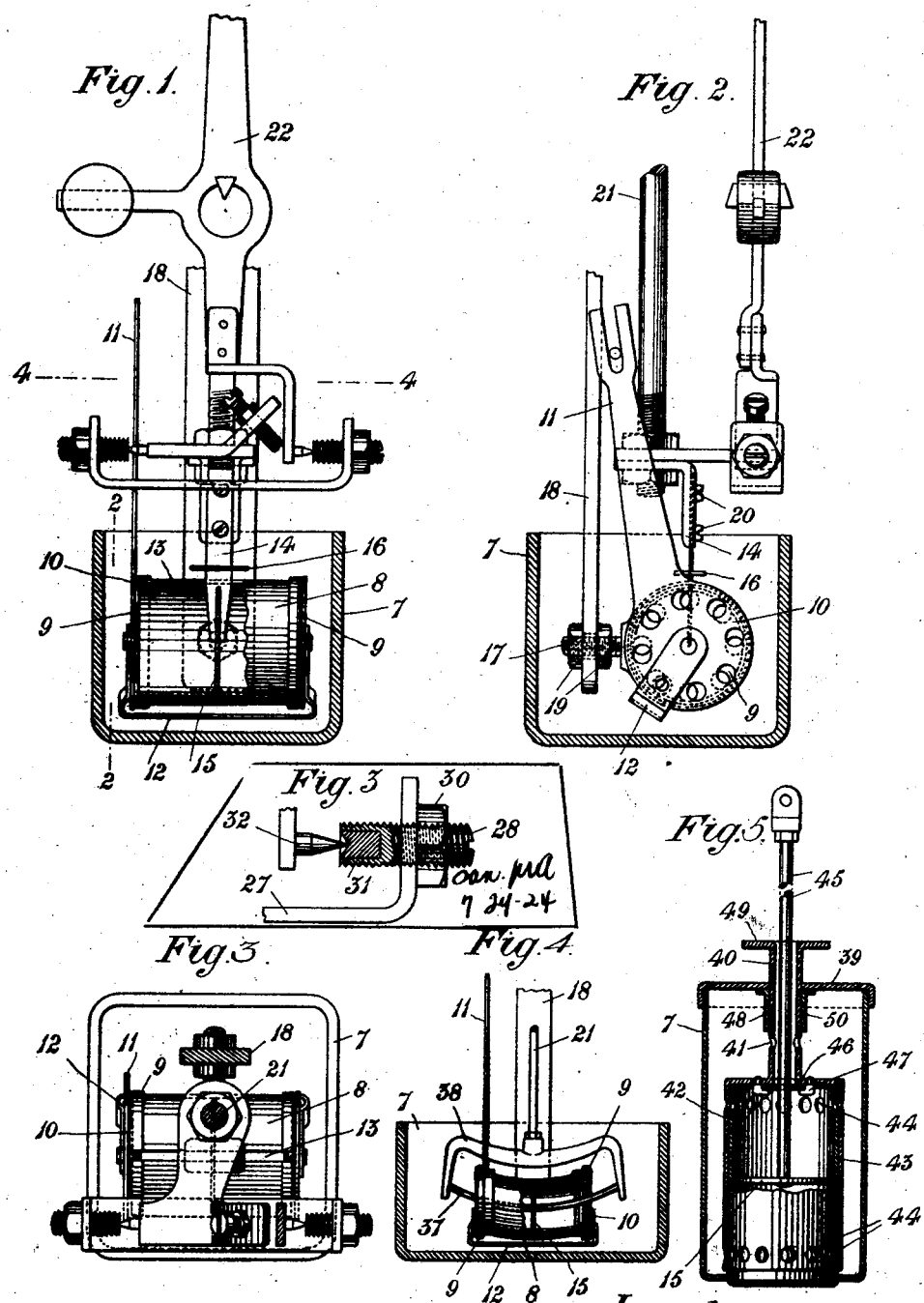
Inventor:—
Ernest L. Blick.
by George L. Folkes.
his Attorney Patented Apr. 6, 1926.

1,579,635

UNITED STATES PATENT OFFICE.

ERNEST LESLIE BLICK, OF BROADHEATH, ALTRINCHAM, ENGLAND, ASSIGNOR TO THE AUTOMATIC SCALE COMPANY, LIMITED, OF ALTRINCHAM, CHESHIRE, ENGLAND.

WEIGHING SCALE.

Application filed June 4, 1923. Serial No. 643,445.

*To all whom it may concern:*

Be it known that ERNEST LESLIE BLICK, a subject of the King of Great Britain, residing at Timperley Works, Manchester Road, Broadheath, Altrincham, Cheshire, England, has invented a new and useful Improvement in or Connected with Weighing Scales; and he does hereby declare the following to be a full, clear, and exact description of the same.

This invention has reference to improvements in or connected with motion retarding devices for use with weighing scales.

The invention consists of an improved motion retarding device particularly adapted for use in combination with automatic or semi-automatic weighing scales, and is characterized by a fluid containing receptacle within which is located an apertured substantially enclosed container having mounted therein a piston adapted for reciprocal motion, the piston admitting of a flow of fluid between its periphery and the interior of the said container.

The invention will now be described with reference to the accompanying sheet of drawings in which similar reference numerals indicate similar parts.

Fig. 1 is a part sectional front elevation of one construction of the invention.

Fig. 2 is a part sectional end elevation taken on line 2—2 of Fig. 1.

Fig. 3 is a sectional plan on line 4—4 of Fig. 1.

Fig. 4 is a part sectional front elevation of a modified construction of the dashpot seen in Fig. 1, and Fig. 5 is a part sectional front elevation of a further modified construction of the dashpot which in this construction is adapted for a vertical reciprocal motion of the piston.

Referring first particularly to the construction of the invention illustrated by Figures 1 to 3 of the drawings, a tank 7 adapted to contain oil or other suitable liquid is mounted on the base of the scale housing. Disposed within this tank is a tubular container 8 the ends of which are substantially closed by perforated caps 9 the size of the apertures in the said caps being adjustable by means of the rotation of the correspondingly perforated discs 10 which are rotated by means of the arm 11, the discs 10 being connected together by means of the spring clip 12. This method of adjustment of the size of the perforations between the cap 9 and the disc 10 is clearly seen on reference to Fig. 2 of the drawings which show the registering perforations adjusted for say one third opening. The area of these registering perforations determines the speed of flow of the oil or other liquid between that contained in the tank 7 and that within the tubular container 8. The container is formed with a longitudinal slot 13 in its upper face whereby an arm 14 connected to the pendulous weight resistant arm 21 or to the index pointer 22 of the scale can enter the container 8, and according to the degree of angular motion which is imparted to the arm 21 or to the index pointer the degree of motion of the arm 14 is governed. This arm 14 is connected to a circular piston 15 which is disposed within the container 8 and forms the means for displacing the liquid within the container the degree of displacement depending upon the angular motion imparted to it by the movement of the arm 14. In addition a baffle plate 16 may be mounted on the arm 14 to break the force of any liquid escaping through the longitudinal slot 13 in the container 8. The container may be adjusted in a horizontal direction by means of the screwed stem 17 by which the container is mounted on the vertical arm 18 to which it is locked by means of the nuts 19; or in the vertical direction by means of the arm 14 and the screws 20 by means of which the arm is connected to the angularly moving pendulous arm 21.

Referring now briefly to the modified construction illustrated by Fig. 4, this is employed where it is desired to obtain a relatively stronger damping effect than that obtained by the constructions seen in Figs. 1 to 3. In this construction the walls of the tubular container 8 are formed radial for the purpose of providing a minimum amount of clearance between the periphery of the piston 15 and the interior of the container 8. In this construction the piston is carried by a segmental rod 37 which is secured at its ends to the yoke 38 which is mounted at the lower end of the pendulous arm 21. It will be seen that in this construction the longitudinal slot 13 is dispensed with and that the piston is connected to the arm 21 through apertures in the end caps 9 and the apertured discs 10.

Referring now to the further modification illustrated in Fig. 5, this shows a vertical adaptation of the dashpot. In this construction the tank 7 is provided at its upper end with a cap 39 which carries a flanged tubular sleeve 40 having ports 41 therein. This sleeve carries the outer rotatable cylindrical member 42 of the inner cylindrical container 43, this cylindrical member 42 and the container 43 being correspondingly apertured near their upper and lower sections as designated 44. Adapted for vertical reciprocation within the container 43 is a piston 15 connected to the vertical rod 45 which in turn is pivotally connected to a part of the lever mechanism of the scale. In this construction a disc valve 46 is employed to prevent any excessive amount of the liquid from being forced up the tubular sleeve 40. This valve has a seating 47 which is secured to the upper section of the rotatable cylinder 42 and any liquid which escapes beyond the valve 46 returns to the sleeve through the ports 41. A set screw 48 determines the amount of radial adjustment which can be imparted by the knurled flange 49 of the tubular sleeve 40 to the apertured rotatable cylinder 42, the set screw 48 being secured to the tubular sleeve 40 and is permitted motion within an arcuate slot in the cylindrical bush 50 secured to the cap 39.

The aforesaid constructions and arrangement of the motion retarding mechanism is such that any movement which is imparted to say the pendulous arm 21 of the scale mechanism is communicated to the index pointer 22 and simultaneously to the piston 15 within the tubular container 8 (or 43 Figure 5), this movement of the piston causes a displacement of the liquid within the container which is primarily displaced and flows through the perforations of the container into the oil tank 7 surrounding it, or vice versa. It will be observed that a certain flow of liquid can take place around the periphery of the piston 15 between the said periphery and the interior of the tubular container so that no frictional contact obtains between these parts.

Claims:—

1. A motion retarding device for use in combination with weighing scales comprising a fluid containing receptacle, a cylinder disposed within said receptacle and having perforations in its walls adjacent each end thereof said perforations admitting of the circulation of the liquid in the said receptacle through the cylinder, a reciprocally operable piston disposed within the said cylinder and free of contact with the walls thereof, means adapted to co-operate with said perforations for adjusting the degree of opening permitted thereto, means whereby said adjustment can be effected from the exterior of said receptacle and means for connecting said piston to an operative part of the scale mechanism.

2. A motion retarding device for use in connection with weighing scales comprising a fluid containing receptacle, a cylinder disposed within said receptacle, perforations in the ends of the said cylinder, said perforations admitting of the circulation of the liquid contained in the fluid receptacle through the cylinder, perforated discs rotatably mounted at each end of said cylinder, a spring clip connecting said discs, a regulating arm connected with one of said discs and adapted for actuation from the outside of said container, a piston adapted for reciprocation within said container, and free of contact with the walls thereof, and means for connecting said piston to an operative part of the scale mechanism.

3. A motion retarding device for use in connection with weighing scales comprising a fluid containing receptacle, a cylinder disposed within said receptacle, and having perforations in its walls adjacent each end thereof, a rotatable perforated member disposed about said cylinder and adapted for co-operation with the perforations formed therein for determining the degree of opening of the said perforations, means connected with said rotatable member and operable from the outside of the fluid containing receptacle for effecting the adjustment of the opening of the perforations, a reciprocally operable piston disposed within said cylinder and free of contact with the walls thereof and means for connecting said piston to an operative part of the scale mechanism.

In testimony whereof, I have signed my name to this specification.

ERNEST LESLIE BLICK.